(12) United States Patent
Kwon

(10) Patent No.: US 6,516,484 B2
(45) Date of Patent: Feb. 11, 2003

(54) METHOD OF RINSING LAUNDRIES IN WASHING MACHINE WITH TILTED TUB

(75) Inventor: Oh Hoon Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 55 days.

(21) Appl. No.: 09/818,760

(22) Filed: Mar. 28, 2001

(65) Prior Publication Data

US 2001/0027579 A1 Oct. 11, 2001

(30) Foreign Application Priority Data

Mar. 30, 2000 (KR) .......................................... 00/16642

(51) Int. Cl.$^7$ .................................................. D06F 23/06
(52) U.S. Cl. .............................. 8/158; 8/159; 68/12.12; 68/24
(58) Field of Search ...................... 8/158, 159; 68/12.02, 68/12.04, 12.05, 12.06, 12.12, 12.19, 12.21, 24, 25, 23.4

(56) References Cited

U.S. PATENT DOCUMENTS

| | | | | |
|---|---|---|---|---|
| 1,861,244 A | * | 5/1932 | Schwieterman | |
| 2,615,320 A | * | 10/1952 | Belaieff | |
| 2,807,963 A | * | 10/1957 | Osterhus et al. | |
| 2,986,914 A | * | 6/1961 | Bruken | |
| 3,086,836 A | * | 4/1963 | Ohmann | |
| 3,116,626 A | * | 1/1964 | Moschetti et al. | |
| 3,246,491 A | * | 4/1966 | Buss | |
| 3,367,153 A | * | 2/1968 | Brubaker et al. | |
| 3,387,310 A | * | 6/1968 | Marshall | |
| 3,464,673 A | * | 9/1969 | Cargo et al. | |
| 3,663,975 A | * | 5/1972 | Fish et al. | |
| 4,328,600 A | * | 5/1982 | Bochan | |
| 4,835,993 A | * | 6/1989 | Dreher | |
| 5,161,393 A | * | 11/1992 | Payne et al. | |
| 5,606,877 A | * | 3/1997 | Hashimoto | |
| 5,737,790 A | * | 4/1998 | Badger et al. | |
| 6,286,344 B1 | * | 9/2001 | Jeon et al. | |

* cited by examiner

*Primary Examiner*—Frankie L. Stinson
(74) *Attorney, Agent, or Firm*—Birch, Stewart, Kolasch & Birch, LLP

(57) ABSTRACT

A method of rinsing laundries in a washing machine with a tilted washing tub consisting of an outer tub and an inner tub is disclosed. In the method of this invention, a predetermined amount of water is primarily fed to the washing tub while constantly rotating the inner tub at an initial speed of no higher than a predetermined rpm, with the amount of water being predetermined in accordance with the weight of the laundries to be rinsed within the washing tub. Thereafter, a circulation-rinsing step is performed. In this step, the laundries are rinsed while rotating the inner tub at a second speed, with the water repeatedly circulated from the washing tub to a nozzle provided at the upper portion of the washing tub through a water circulation hose, and sprayed under pressure from the nozzle into the washing tub. After the circulation-rinsing step, the water is drained from the washing tub to the outside of the cabinet of the washing machine through a drain hose prior to rotating the inner tub at a third speed of no lower than the second speed so as to dewater the rinsed laundries. Thereafter, the process from the rinsing water feeding step to the dewatering step is repeated until a preset number of rinsing processes have been completed.

7 Claims, 4 Drawing Sheets

METHOD OF RINSING LAUNDRIES IN WASHING MACHINE WITH TILTED TUB

BACKGROUND OF THE INVENTION

1. Field of the Invention

The present invention relates to a method of rinsing laundries in a washing machine with a tilted washing tub and, more particularly, to a method of more effectively rinsing laundries within the tilted washing tub by repeatedly feeding water under pressure from the interior of the tilted tub to the upper portion of the tub and spraying the pressurized water into the tub from a nozzle provided at the upper portion of the tub during the rinsing process.

2. Description of the Prior Art

FIG. 1 is a sectional view, showing the construction of a conventional upright washing machine.

As shown in the drawing, the washing tub 20 of such a conventional upright washing machine is upright suspended within the central portion of a cabinet 10 by four suspension arms 30, and so the washing machine has been so-called "an upright washing machine". A drive motor 40 is installed at the lower end of the washing tub 20 to rotate a perforated inner tub 23 of the washing tub 20.

The above washing tub 20 has a double-tub structure, with an outer tub 22 containing water therein during the washing or rinsing process, and a rotary inner tub 23 concentrically and rotatably set within the outer tub 22. The perforated inner tub 23 is rotatable by the drive motor 40 relative to the outer tub 22. This inner tub 23 contains laundries therein, and washes and rinses the laundries.

A drain hose 26, having a drain valve 27, extends from the bottom wall of the outer tub 22 to the outside of the cabinet 10, and discharges water from the outer tub 22 when necessary. A pulsator 25 is set on the bottom wall of the inner tub 23, and pulsates, beats and throbs to improve the laundering effect of the washing machine.

Such a conventional upright washing machine is operated as follows.

When the washing machine, with laundries and detergent contained within the inner tub 23 of the washing tub 20, is turned on, water is primarily fed into the inner tub 23 to start the primary washing process. In such a case, because the inner tub 23 is perforated such that the interior of the inner tub 23 to connect with the interior of the outer tub 22 through perforations, water is commonly contained in both the inner and outer tubs 23 and 22 and reach the same water level. When the water reaches a predetermined reference level within the washing tub 20, the drive motor 40 is turned on to rotate the inner tub 23 within the outer tub 22 at a low speed, thus primarily washing the laundries within the inner tub 23.

After a predetermined time has elapsed after the end of the primary washing process, the drive motor 40 is stopped, while the drain valve 27 is opened to discharge the washing water from the washing tub 20 to the outside of the cabinet 10 through the drain pipe 26.

After the water is completely drained from the washing tub 20 after the primary washing process, fresh water is newly fed into the washing tub 20 prior to starting a rinsing process. During such a rinsing process, the washing machine performs the same operation as that of the washing process. It is typical in the conventional washing machine to repeat such a rinsing process two or three times, with the same times of washing processes alternately performed between the repeated rinsing processes.

After the repeated washing and rinsing processes are completely finished, the inner tub 23 is rotated at a high speed to dewater the laundries.

The method of rinsing laundries in such a conventional washing machine is problematic in that it is necessary to feed rinsing water into the washing tub 20 until the water reaches a predetermined water level allowing the laundries within the inner tub 23 to be completely submerged under water. Therefore, the conventional rinsing method undesirably consumes an excessive amount of water in addition to increasing the water feeding and draining time, resulting in increasing the total processing time of the washing machine while performing a laundering operation. Another problem experienced in the conventional rinsing method resides in that the method fails to accomplish a desired rinsing effect.

SUMMARY OF THE INVENTION

Accordingly, the present invention has been made keeping in mind the above problems occurring in the prior art. An object of the present invention is thus to provide a method of rinsing laundries in a washing machine with a tilted washing tub, which repeatedly feeds water under pressure from the interior of the tilted washing tub to the upper portion of the tub through a water circulation hose, and sprays the pressurized water into the tub from a nozzle provided at the upper portion of the tub while rotating the tub during the rinsing process, and which reduces the amount of water required in the rinsing process in addition to the processing time during the rinsing process, and improves the rinsing effect.

In order to accomplish the above object, the present invention provides a method of rinsing laundries in a washing machine with a tilted washing tub consisting of an outer tub and an inner tub, comprising the steps of: feeding a predetermined amount of rinsing water to the washing tub while constantly rotating the inner tub at an initial speed of no higher than a predetermined rpm, with the amount of the rinsing water being predetermined in accordance with the weight of the laundries to be rinsed; circulation-rinsing the laundries while rotating the inner tub at a second speed, with the rinsing water repeatedly circulated from the washing tub to the upper portion of the washing tub, and sprayed under pressure into the washing tub from the upper portion of the washing tub; draining the rinsing water from the washing tub to the outside of the cabinet of the washing machine after the circulation-rinsing step is finished; rotating the inner tub at a third speed of no lower than the second speed so as to dewater the rinsed laundries; and repeating the process from the rinsing water feeding step to the dewatering step until a preset number of rinsing processes have been completed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
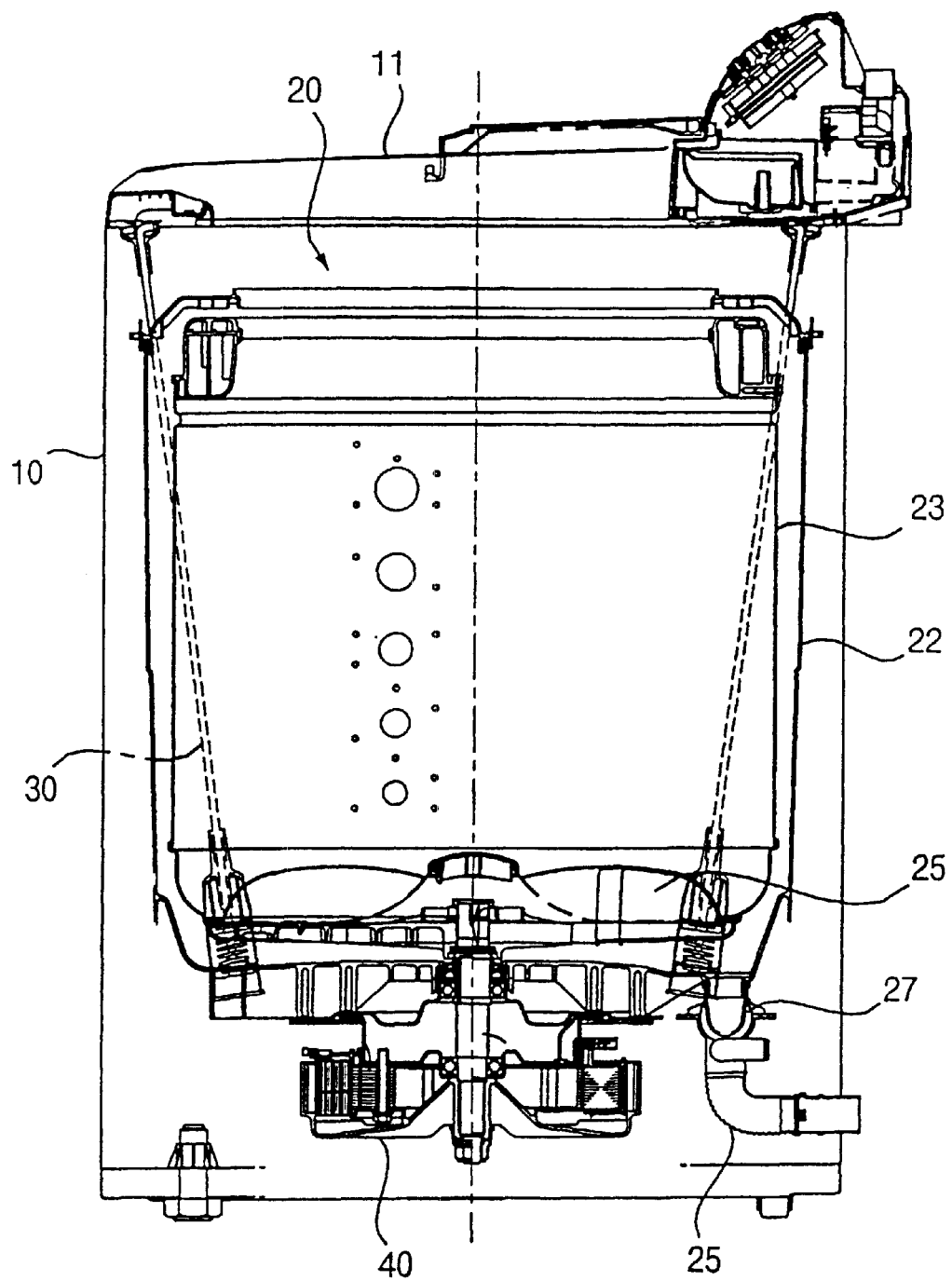
FIG. 1 is a sectional view, showing the construction of a conventional upright washing machine.
Figure 2:
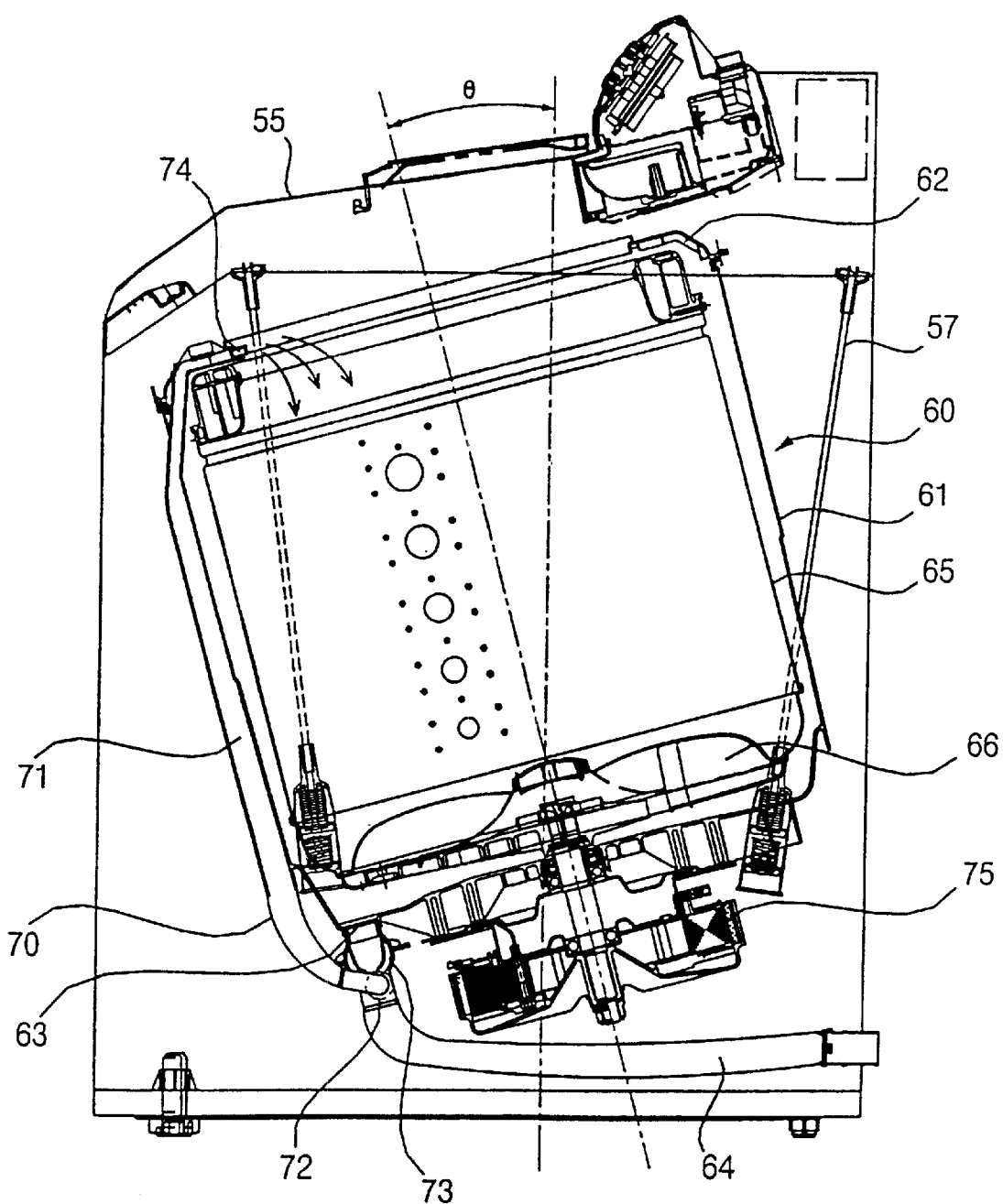
FIG. 2 is a sectional view, showing the construction of a tilted washing machine with a tilted washing tub, in which the rinsing method according to the preferred embodiment of the present invention is performed.

FIG. 2 is a sectional view, showing the construction of a washing machine with a tilted washing tub, in which the rinsing method according to the preferred embodiment of the present invention is performed.

As shown in the drawing, the cabinet 50 of the washing machine of this invention is provided with a door 55 at its top end, and uprightly stands on a support surface in the same manner as that of a conventional upright washing machine. In the washing machine of this invention, the washing tub 60 is suspended within the cabinet 50 by four suspension arms 57 while being tilted downward at the front at an inclination angle θ relative to the vertical axis of the cabinet 50. The four suspension arms 57 are connected to the upper portion of the cabinet 50 at their upper ends, and to the lower end portion of the washing tub 60 at their lower ends such that the arms 57 suspend the washing tub 60 within the cabinet 50 while tilting the washing tub 60 downward at the front. Due to the tilted washing tub 60, the washing machine of this invention is so-called "a tilted washing machine". A drive motor 75 is installed at the lower end portion of the washing tub 60.

The washing tub 60 of this tilted washing machine has a double-tub structure, with an outer tub 61 and a rotary inner tub 65. The outer tub 61 is suspended within the cabinet 50 by the four suspension arms 57 while being tilted downward at the front at an inclination angle θ relative to the vertical axis of the cabinet 50. The rotary inner tub 65 is perforated at its sidewall, and is concentrically and rotatably set within the outer tub 61. This perforated inner tub 65 is rotatable by the drive motor 75 relative to the outer tub 61, with a pulsator 66 set on the bottom wall of the inner tub 65 and pulsating, beating and throbbing to improve the laundering effect of the washing machine.

In the present invention, it is preferred to set the forward inclination angle θ of the tilted washing tub 60, consisting of inner and outer tubs 65 and 61, relative to the vertical axis of the cabinet 50 to a range of $0°<\theta<30°$.

When the washing tub 60 is installed within the cabinet 50 while being tilted downward at the front at an inclination angle relative to the vertical axis of the cabinet 50 as described above, it is possible to improve the laundering effect and reduce the deviation in the laundering effect of the washing machine. That is, when such a tilted washing tub 60 is rotated, water within the inner tub 65 actively and asymmetrically swirls due to the relationship between gravity, centrifugal force and the internal surface of the sidewall of the tilted inner tub 65, thus causing a complex fabric activity of the laundries within the inner tub 65. This finally improves the laundering effect, and reduces the deviation in the laundering effect of the washing machine.

A drain port 63 is formed on the bottom wall of the tilted outer tub 61 at a lower part, with a drain hose 64 extending from the drain port 63 to the outside of the cabinet 50.

A water circulation hose 70 is branched from the outside end of the drain port 63, and extends upward along the tilted washing tub 60 so as to selectively and forcibly feed water from the washing tub 60 to the upper portion of the inner tub 65.

That is, the water drainage system of this tilted washing machine is designed such that water during the washing or rinsing process is repeatedly circulated from the washing tub 60 to the upper portion of the inner tub 65 through the water circulation hose 70 so as to be sprayed under pressure from the upper portion of the inner tub 65 into said inner tub 65, and water during the drainage process is discharged from the washing tub 60 to the outside of the cabinet 50 through the drain hose 64.

The above water circulation hose 70 is connected to the lower end of a water circulation channel 71 at its upper end. The water circulation channel 71 is integrally formed on the sidewall of the outer tub 61, and extends from the water circulation hose 70 to a nozzle 74. This nozzle 74 is fixedly set in a tub cover 62, and sprays water under pressure into the interior of the inner tub 65.

In the present invention, it should be understood that the water circulation channel 71 may be produced separately from the outer tub 61 prior to being attached to the sidewall of the outer tub 61 without affecting the functioning of this invention.

A three-way valve 72 is installed at the junction of the drain hose 64 and the water circulation hose 70 so as to selectively close either of the two hoses 64 and 70 in accordance with an operational mode of the washing machine. Provided around the drain port 63 at a position before the three-way valve 72 is a pump 73, which is used for pumping water from the interior of the washing tub 60 so as to selectively feed the water under pressure to the nozzle 74 of the tub cover 62 during the washing or rinsing process or to drain the pressurized water to the outside of the cabinet 50 during the drainage process.

In the preferred embodiment of the present invention, one pump 73 is preferably installed within the single drain port 63 before the junction of the two hoses 64 and 70 since the two hoses 64 and 70 are branched from the single drain port 63. However, it should be understood that the drain hose and the water circulation hose may separately extend from the bottom wall of the outer tub 61 at different positions, with two pumps provided separately for the two hoses.

Figure 3:
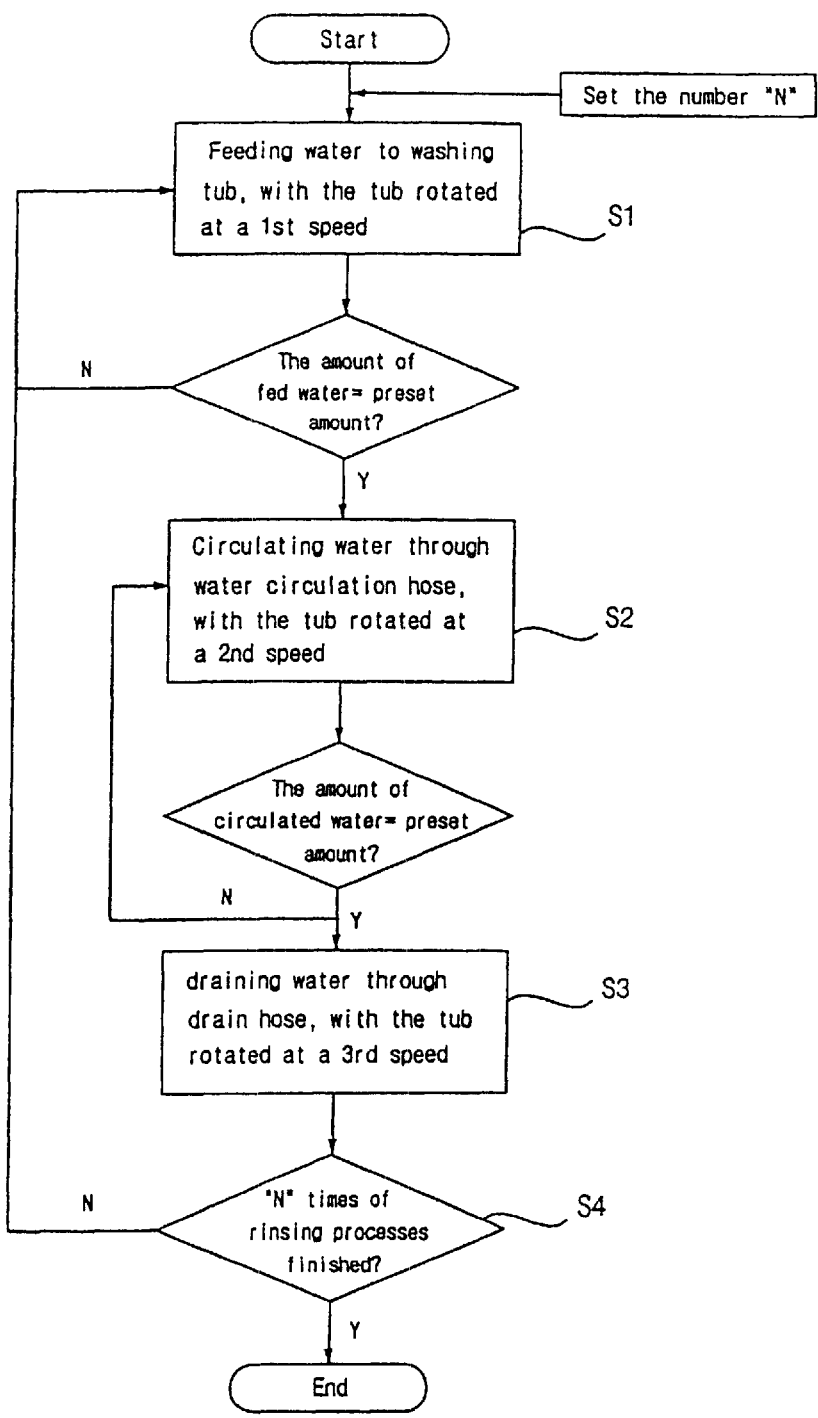
FIG. 3 is a flowchart of the rinsing method of the present invention.

FIG. 3 is a flowchart of the rinsing method of the present invention.

As expressed in the flowchart, the rinsing method of this invention is performed in the above-mentioned tilted washing machine after each washing process comprising the steps of water feeding, washing, water draining, and dewatering. That is, this rinsing method is performed to remove detergent components from laundries after each washing process, and comprises the steps of water feeding, circulation-rinsing, water draining, and dewatering as will be described in more detail herein below.

The rinsing process of this invention will be described in detail with reference to FIGS. 3 and 4. When the rinsing process of this invention is started, rinsing water, of which the amount is set to ½~5 times the weight of laundries to be rinsed within the inner tub 65, is primarily fed into the tilted washing tub 60 at step S1 while constantly rotating the inner tub 65 of the washing tub 60 at an initial speed of no higher than 50 rpm. After the water feeding step S1, the circulation-rinsing step S2 is performed. At step S2, the laundries are rinsed with the rinsing water while constantly rotating the inner tub 65 at a second speed of 50~300 rpm. In such a case, the rinsing water is circulated from the interior of the washing tub 60 to the nozzle 74 through the water circulation hose 70 at a flow rate, which is set such that the amount of circulated water within this circulation-rinsing step is equal to ½~5 times the weight of the laundries. After the circulation-rinsing step S2, the water draining and dewatering step S3 is performed. At step S3, water is drained from the interior of the washing tub 60 to the outside of the cabinet 50 through the drain hose 64 prior to rotating the inner tub 65 at a third speed of no lower than 400 rpm, which is higher than the maximum speed of the tub 65 at step S2, thus dewatering the rinsed laundries.

After the water draining and dewatering step S3, it is determined at step S4 whether a preset number "N" of rinsing processes have been completely repeated. When the answer of step S4 is "Yes", the rinsing process is ended. However, when answer of step S4 is "No", the steps S1 to S4 are repeated again.

At the water feeding step S1, a level sensor (not shown) is installed on the washing tub 60 to sense the level of water fed into the washing tub 60. In the present invention, it is preferred to set the amount of rinsing water fed to the washing tub at step S1 to ½~3 times the weight of laundries to be rinsed.

At the circulation-rinsing step S2, it is preferable to rotate the inner tub 65 at a predetermined speed, which is determined such that the radial acceleration of the inner tub 65, that is, the value resulting from a multiplication of the radius "R" of the inner tub 65 by the square of the angular velocity "W" of said inner tub 65 is included within a range of ½~2 times the gravitational acceleration "g". This relationship between "R", "W" and "g" is clearly expressed by the following expression (1).

$$\tfrac{1}{2} \times g < RW^2 < 2 \times g \tag{1}$$

In the present invention, it is preferred to set the rotating speed of the inner tub 65 to about 50~200 rpm.

In addition, it is preferably set the rinsing water circulation time at the circulation-rinsing step S2 such that the rinsing water can be circulated from the interior of the washing tub 60 to the nozzle 74 at a flow rate, which is set such that the amount of circulated water within this circulation-rinsing step is equal to ½~3 times the weight of the laundries to be rinsed. For example, when it is desired to rinse 1 kg of laundries, the rinsing water circulation time at the circulation-rinsing step S2 is preferably set such that about 0,5λ~3λ of rinsing water can be circulated within the preset water circulation time.

At the water draining and dewatering step S3, the three-way valve 72 primarily opens the drain hose 64 so as to drain water from the interior of the washing tub 60 to the outside of the cabinet 50. When a drain pump is provided at the drain hose 64, the drain pump is operated at step S3 to pressurize the drain water and to discharge the water from the washing tub 60 more quickly. After the primary drainage of water from the washing tub 60 to the outside of the cabinet 50, the inner tub 65 is rotated at a high speed of about 400 rpm ~650 rpm, thus removing the water together with detergent components from the laundries and expelling the water together with detergent components to the outside of the cabinet 50.

In the preferred embodiment of FIG. 2, the drain hose 64 and the water circulation hose 70 are commonly branched from the drain port 63 at a position around the three-way valve 72, with the pump 73 installed around the drain port 63 at a position before the valve 72. In such a case, both the three-way valve 72 and the pump 73 are controlled at the circulation-rinsing step S2 such that water is repeatedly circulated from the interior of the washing tub 60 to the nozzle 74 through the water circulation hose 70. On the other hand, at the water draining and dewatering step S3, the three-way valve 72 is controlled such that the water is discharged from the interior of the washing tub 60 to the outside of the cabinet 50 through the drain hose 64.

When a water circulation hose with a circulation pump and a drain hose with a drain valve extend from the bottom wall of the washing tub 60 separately at different positions, the circulation pump is operated at the circulation-rinsing step S2 with the drain valve closing the drain hose. It is thus possible to repeatedly circulate water under pressure from the washing tub to the nozzle through the water circulation hose for rinsing the laundries within the inner tub.

When it is determined at step S4 that the preset number "N" of rinsing processes have been completely repeated, the rinsing process is ended.

The operational effect of the rinsing process of this invention will be described herein below.

Figure 4:
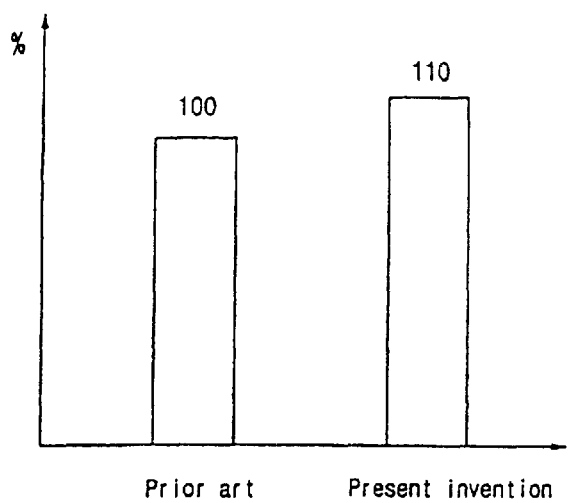
FIG. 4 is a graph, showing the rinsing effect of the rinsing method of this invention in comparison with that of a conventional rinsing method.

The circulation-rinsing process of this invention, wherein rinsing water under pressure is repeatedly fed from the washing tub 60 to the nozzle 74 of the tub cover 62 through the water circulation hose 70 so as to be sprayed into the inner tub 65, improving the rinsing effect of the washing machine as shown in the graph of FIG. 4.

That is, differently from a conventional rinsing process, of which the rinsing effect is only created by an agitation effect created by the rotating action of the inner tub with rinsing water contained within the washing tub to a predetermined water level, the rinsing process of this invention sprays pressurized water from the nozzle 74 provided at the upper portion of the inner tub 65 while circulating the rinsing water from the tilted washing tub 60 to the nozzle 74 through the water circulation hose 70 and rotating the inner tub 65 at a proper speed. The rinsing method of this invention thus accomplishes a pressurized water spraying effect caused by the circulation-rinsing process in addition to the agitation effect created by the rotating action of the inner tub 65, thereby finally improving the rinsing effect.

Figure 5:
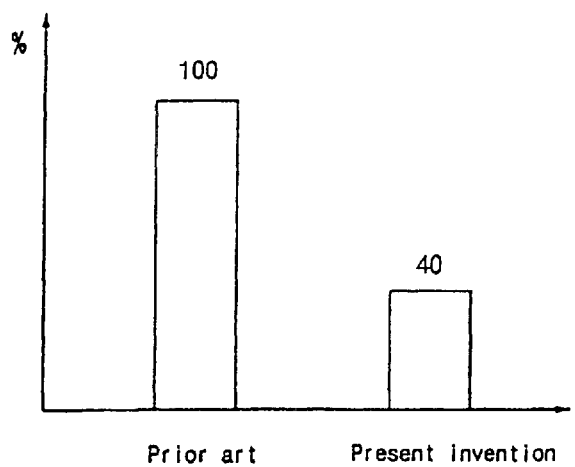
FIG. 5 is a graph, showing the amount of water required in the rinsing method of this invention in comparison with that of a conventional rinsing method.

In addition, the rinsing process of this invention accomplishes both the desired agitation effect and the desired water spraying effect while continuously circulating the rinsing water from the bottom portion of the tilted washing tub 60 to the upper portion of the inner tub 65. Therefore, this rinsing process effectively improves the rinsing effect while preferably reducing the amount of water consumed during the rinsing process in comparison with the conventional rinsing process as shown in the graph of FIG. 5.

That is, different from the conventional rinsing process, of which the rinsing effect is only expected from the rotating action of the inner tub with rinsing water contained within the washing tub to a predetermined water level, thus creating an agitation effect and a friction effect between the laundries and the rinsing water, the rinsing process of this invention sprays pressurized water from the nozzle 74 into the inner tub 65 while circulating the rinsing water from the tilted washing tub 60 to the nozzle 74 and rotating the inner tub 65 at a proper speed. This rinsing method thus enhances the rinsing force of the water while reducing the amount of water required in the rinsing process.

Since the rinsing process of this invention uses a small amount of water as described above, it is possible to preferably reduce the water feeding time in addition to a water draining time during a rinsing process. This finally reduces the total processing time of the washing machine during the laundering operation. This also allows a larger number of rinsing processes to be effectively performed within the same time in comparison with a conventional rinsing process, and so the rinsing process of this invention further improves the rinsing effect.

As described above, the present invention provides a method of rinsing laundries in a washing machine with a tilted washing tub. This repeatedly feeds rinsing water under pressure from the interior of the tilted washing tub to the upper portion of the inner tub of the washing tub through a water circulation hose, and sprays the pressurized water into the inner tub from a nozzle provided at the upper portion of the inner tub while rotating the inner tub during a rinsing process. This rinsing method thus preferably reduces the amount of water required in the rinsing process in addition to reducing the processing time during the rinsing process, and improves the rinsing effect.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of rinsing laundries in a washing machine with a tilted washing tub consisting of an outer tub and an inner tub, comprising the steps of:

feeding a predetermined amount of rinsing water to said washing tub while constantly rotating said inner tub at an initial speed of no higher than a predetermined rpm or else stopping the inner tub, with the amount of the rinsing water being predetermined in accordance with the weight of the laundries to be rinsed; and circulation-rinsing the laundries while rotating the inner tub at a second speed, with the rinsing water repeatedly circulated from the washing tub to an upper portion of said washing tub, and sprayed under pressure into the washing tub from said upper portion of the washing tub.

2. The rinsing method according to claim 1, further comprising:

draining the rinsing water from the washing tub to the outside of a cabinet of the washing machine after the circulation-rinsing step is finished;

rotating the inner tub at a third speed of no lower than said second speed so as to dewater the rinsed laundries; and repeating the process from the rinsing water feeding step to the dewatering step until a preset number of rinsing processes have been continuously and completely repeated.

3. The rinsing method according to claim 2, wherein said third rotating speed of said inner tub in the dewatering step is not lower than 400 rpm.

4. The rinsing method according to claim 1, wherein said initial rotating speed of the inner tub in the water feeding step is not higher than 50 rpm, and said second rotating speed of the inner tub in the circulation-rinsing step is set at a range of 50~300 rpm.

5. The rinsing method according to claim 1, wherein a radial acceleration of said inner tub at the circulation-rinsing step has a range expressed by the following expression, $$\tfrac{1}{2} \times g < RW^2 < 2 \times g$$

wherein,

W: an angular velocity of the inner tub,

R: a radius of the inner tub, and g: the gravitational acceleration.

6. The rinsing method according to claim 1, wherein the amount of water fed to the washing tub at the water feeding step is set to ½~3 times the weight of the laundries contained within the washing tub.

7. The rinsing method according to claim 1, wherein the amount of circulated water at the circulation-rinsing step is set to ½~3 times the weight of the laundries contained within the washing tub.

* * * * *